UNITED STATES PATENT OFFICE.

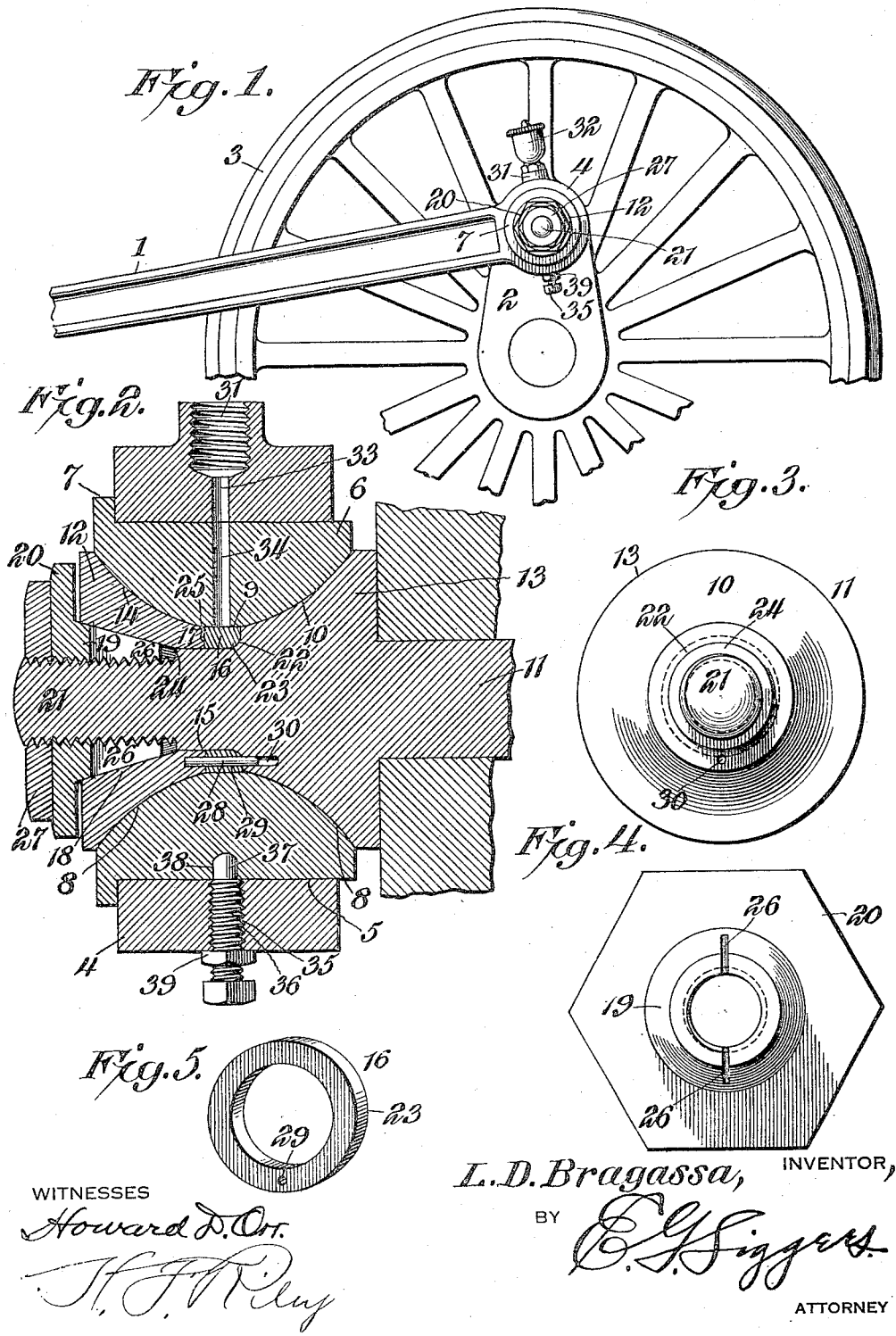

LOUIS D. BRAGASSA, OF AUGUSTA, GEORGIA.

WEAR-COMPENSATING BEARING.

1,124,282. Specification of Letters Patent. Patented Jan. 12, 1915.

Application filed August 30, 1913. Serial No. 787,505.

*To all whom it may concern:*

Be it known that I, LOUIS D. BRAGASSA, a citizen of the United States, residing at Augusta, in the county of Richmond and State of Georgia, have invented a new and useful Wear-Compensating Bearing, of which the following is a specification.

The invention relates to improvements in bearings for locomotives, etc.

The object of the present invention is to provide for use on the main rods and side rods of locomotives, and various other engines and machinery having cranks, wrist pins, shafts and analogous elements with terminal journal portions a simple, practical and comparatively inexpensive one-piece bushing having an increased bearing surface and a coacting journal, equipped with means for taking up both the lateral and circumferential wear, whereby the life of the bushing is materially increased and the necessity of removing and renewing the same at short intervals is eliminated.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a bushing, constructed in accordance with this invention and shown applied to the main rod of a locomotive. Fig. 2 is an enlarged sectional view, taken longitudinally of the crank pin. Fig. 3 is an end elevation of the crank pin. Fig. 4 is a rear elevation of a conical nut. Fig. 5 is a detail view of the intermediate bearing ring.

Like numerals of reference designate corresponding parts in all the figures of the drawing.

In the accompanying drawing in which is illustrated the preferred embodiment of the invention, the device is shown applied to a main rod 1 of a locomotive, and it is not confined in its use to locomotives, but is applicable to other types of engines and to various machinery wherever there is an end bearing. The main rod 1 is provided adjacent to the crank portion 2 of the driving wheel 3 with a head 4 having a circular opening 5 with cylindrical walls for the reception of a bushing 6. The bushing 6, which is constructed of brass or other suitable material, consists of a single piece of circular form forced into the opening 5 by a hydraulic press or otherwise secured within the said opening and provided at the front or outer face of the main rod with an annular flange or collar 7, which forms a stop for engaging the main rod. The bushing is provided with a bearing opening consisting of front and rear tapered portions 8 and an intermediate cylindrical portion 9. The opposite front and rear tapered portions of the opening of the bushing present curved bearing faces to a conical bearing surface 10 of the journal portion of a crank pin 11, and to a cone 12 mounted on the crank pin. The curved bearing surfaces of the tapered portions of the bushings are preferably arcs of circles described from different centers, and the conical bearing surface 10, which is formed on an integral conical enlargement 13 of the crank pin 11, is curved to conform to the configuration of the bearing surface of the inner or rear portion of the bushing. The cone 12 presents an exterior curved bearing surface 14 to the bearing surface of the front or outer tapered portion of the bushing.

The crank pin 11, which is secured to the crank 2 in the usual manner, is provided beyond the conical enlargement 13 with an intermediate cylindrical reduced portion 15 on which is mounted an intermediate cylindrical bearing ring 16, presenting an outer cylindrical bearing surface to the intermediate cylindrical bearing face of the bushing and an inner cylindrical face to the intermediate reduced portion 15 of the crank pin. The adjustable cone 12 is provided with an opening having a cylindrical portion 17 and a tapered portion 18, presenting a straight conical face to a conical extension or portion 19 of a nut 20. The crank pin is provided with a threaded outer portion 21 of a diameter slightly less than the intermediate reduced portion 15, and the shoulder 22 formed by the intermediate reduction of the crank pin is curved at the inner portion to fit a correspondingly rounded edge or face 23 of the cylindrical bearing ring. The conical portion 19 of the nut 20 presents a straight tapered outer surface to the tapered portion of the opening of the cone 12, and it is spaced from the shoulder 24 formed by the outer reduced threaded portion 21 of the crank pin, and the head or outer portion of the nut 20 is spaced from the outer end face of the cone 12. The inner end face 25 of the cone 12 fits against the adjacent side face of the bearing ring 16, which is adapted to be faced off as the bushing becomes worn to enable the cone to be advanced on the pin to take up both lateral and circumferential wear. The conical portion 19 of the nut may be provided with a plurality of slots 26 so that the pressure exerted on the said conical portion 19 of the nut will cause the split portions of the said conical portion 19 to grip the threaded portion of the crank pin, but the slots 26 may be omitted, as a lock nut 27 is provided for maintaining the conical nut firmly and securely in engagement with the cone 12.

In order to prevent rotary movement of the bearing ring 16 and the cone 12 on the axle to prevent the bearing from being crossed should constant wear on the parts vary the true circular shape of the bushing and the coacting bearing surfaces, the cone 12 is provided with a pin 28 suitably secured in a bore of the cone 12 and extending from the inner end thereof and passing through an opening 29 in the bearing ring and projecting into a bore or opening 30 of the conical enlargement 13 of the crank pin. The bore or opening 30 extends inwardly from the shoulder 22, and the pin 28 and the openings form a slidable connection between the parts. The gripping of the cone through the wedging action of the conical nut relieves the pin 28 of strain when the parts are assembled, so that only a comparatively light pin need be employed.

The head 4 of the main rod 1 is provided with a threaded opening 31 for the reception of an oil cup 32, and a bore or opening 33 extends downwardly from the opening 31 and communicates with a passage 34, which extends through the bushing to the central cylindrical portion 9 of the opening thereof. The bushing is positively retained in proper position within the opening of the main rod by a keeper set bolt 35, mounted in a threaded opening 36 in the bottom of the head 4 and having a smooth terminal portion 37, which engages a socket or recess 38 in the bushing. The head of the set bolt 35 is spaced from the main rod and a lock nut 39 is arranged on the outer portion of the set bolt.

While the present invention is designed for various terminal journals, it is especially advantageous in its use on the crank pins of a locomotive, as it greatly simplifies the construction and lessens the trouble and cost of maintaining such bearings in proper condition.

What is claimed is:—

1. A device of the class described including a bushing provided with an opening consisting of an intermediate cylindrical portion and opposite inwardly tapered portions, a journal element provided with an inner conical bearing surface to fit one of the tapered portions of the opening of the bushing and having a reduced intermediate portion and provided also with an outer threaded portion, an intermediate bearing ring mounted on the reduced portion of the journal element and having a cylindrical bearing face fitting the intermediate cylindrical portion of the opening of the bushing, a cone fitting within the other tapered portion of the opening of the bushing and having its inner end slidably arranged on the intermediate portion of the journal element, said cone being arranged in spaced relation with the threaded portion of the journal element, and a nut mounted on the threaded portion of the journal element and extending into and engaging the cone interiorly thereof.

2. A device of the class described including a member having an opening, a bushing secured in the said opening and provided with an opening consisting of an intermediate cylindrical portion and oppositely tapered portions, a journal element provided with an inner conical bearing surface to fit one of the tapered portions of the opening of the bushing and provided with a reduced intermediate portion and having an outer threaded portion, an intermediate bearing ring mounted on the threaded portion of the journal element and having a cylindrical bearing face fitting the intermediate cylindrical portion of the opening of the bushing, and a cone fitting the other tapered portion of the opening of the bushing and arranged in spaced relation with the threaded portion of the journal element, said cone having its inner end slidably arranged on the said intermediate portion of the journal element, and a conical nut mounted on the threaded portion of the journal element and fitting in and engaging the cone interiorly thereof.

3. A device of the class described including a bushing having an opening consisting of an intermediate cylindrical portion and oppositely tapered portions presenting smooth bearing surfaces, a journal element having a conical portion presenting a curved surface to one of the tapered portions of the opening of the bushing, said journal element being provided with an intermediate reduced portion and having an outer threaded portion, a ring arranged on the intermediate reduced portion and presenting a cylindrical bearing face to the intermediate portion of the opening of the bushing, a cone fitting within the other tapered portion of the opening of the bushing and provided with an inwardly tapered opening, the walls of which are spaced from the threaded portion of the journal element, said cone having its inner end arranged upon the intermediate reduced portion of the journal element, and a nut mounted on the threaded portion of the journal element and having a conical portion extending into the cone and engaging the interior thereof.

4. A device of the class described including a bushing having an opening consisting of an intermediate cylindrical portion and opposite inwardly tapered portions, a journal element presenting a conical bearing surface to one of the tapered portions of the opening of the bushing and provided with an intermediate cylindrical reduced portion and having an outer threaded portion, a cylindrical bearing ring mounted on the said intermediate reduced portion and arranged within the intermediate portion of the opening of the bushing, a cone fitted within the other tapered portion of the opening of the bushing and provided with an opening consisting of an outer tapered portion spaced from the threaded portion of the journal element and an inner cylindrical portion slidably arranged on the intermediate reduced portion of the journal element, and a nut mounted on the threaded portion of the journal elements and having a conical portion extending into the tapered portion of the opening of the cone and engaging the latter interiorly thereof.

5. A device of the class described including a bushing having an opening consisting of an intermediate cylindrical portion and opposite inwardly tapered portions, a journal element presenting a conical bearing surface to one of the tapered portions of the said opening and having an intermediate reduced portion forming a shoulder, said journal element being also provided with an outer reduced threaded portion and having a bore extending inwardly from the said shoulder, a cylindrical bearing ring arranged on the intermediate reduced portion of the journal element and at the intermediate portion of the opening of the bushing and provided with a bore registering with the said bore, a cone fitting within the other tapered portion of the opening of the bushing in spaced relation with the threaded outer portion of the journal element and having its inner end slidably arranged on the intermediate portion of the journal element, a pin carried by the cone and extending through the bore of the bearing ring into the bore of the journal element and forming a slidable connection between the cone, the ring, and the said journal element, and a nut mounted on the threaded portion of the journal element and engaging the cone interiorly thereof.

In testimony, that I claim the foregoing as my own, I have hereto affixed my signature in the presence of two witnesses.

LOUIS D. BRAGASSA.

Witnesses:
C. W. FOWLER,
DAVID R. WAGNER.

Copies of this patent may be obtained for five cents each, by addressing the "Commissioner of Patents, Washington, D. C."